(No Model.)
J. W. GRAY.
METHOD OF MANUFACTURING RUBBER COATED BELTING.
No. 259,850. Patented June 20, 1882.
Fig. 1.
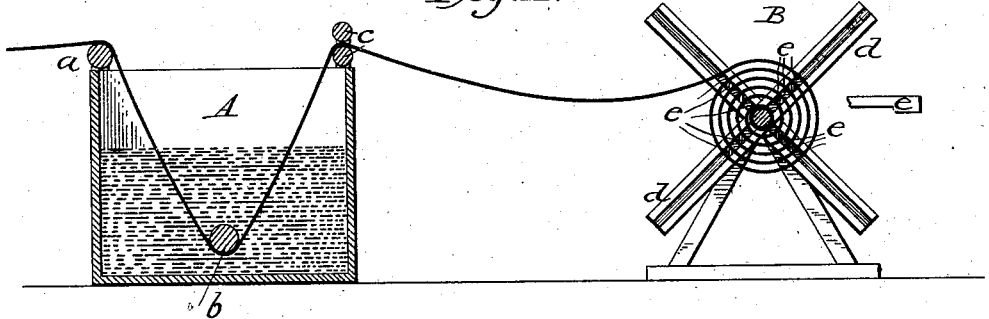
Fig. 2.
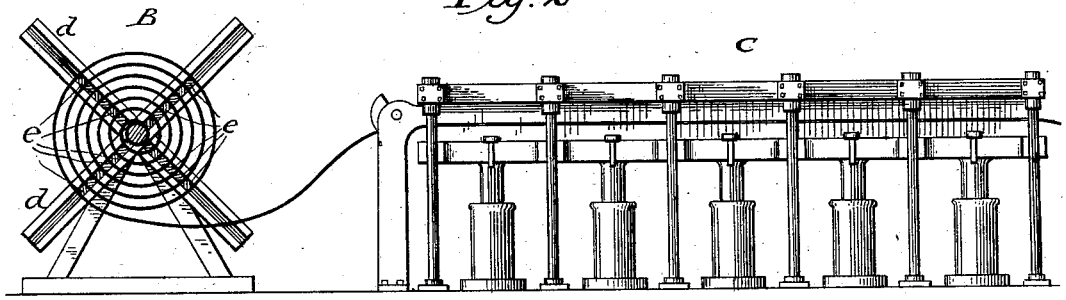
Fig. 3. Fig. 4.
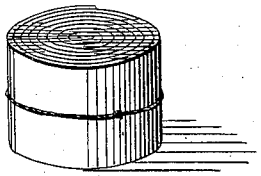 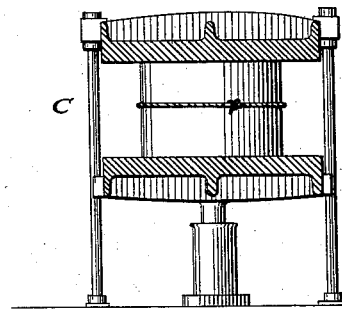
Attest.
Sidney P. Hollingsworth
Walter S. Dodge.
Inventor.
John W. Gray,
by Dodge & Son,
Attys.

UNITED STATES PATENT OFFICE.

JOHN W. GRAY, OF HARTFORD, CONNECTICUT.

METHOD OF MANUFACTURING RUBBER-COATED BELTING.

SPECIFICATION forming part of Letters Patent No. 259,850, dated June 20, 1882.

Application filed April 28, 1882. (No model.)

*To all whom it may concern:*

Be it known that I, JOHN W. GRAY, of Hartford, in the county of Hartford and State of Connecticut, have invented certain Improvements in Rubber Belting and Method of Making the Same, of which the following is a specification.

My invention relates to machine-belting having a rubber face or surface; and it consists in a novel method of producing the same, hereinafter set forth.

Heretofore it has been customary to form belting of this general character either by folding of a wide strip of rubber-coated fabric and covering and securing the exposed edge at the middle of the belt by a separate narrow strip of rubber, or by wrapping a sheet or strip of rubber around the woven fabric and uniting its edges at the middle of the belt by a separate strip of rubber cemented thereto. These plans are objectionable, the first because of the large amount of rubber required, the difficulty of uniting the different folds or layers, and the frequent or common loosening of the edges; the second mainly from the latter cause. By my plan—which, briefly stated, consists in passing the fabric through a liquid or plastic rubber solution or compound and subsequently pressing the flat faces, then coiling the belt and pressing its edges, thus finishing the surfaces and edges—I overcome all these objections and difficulties, besides materially reducing the cost of manufacture.

My process is as follows: The cotton belt is woven in the ordinary manner of single, two, three ply, or more, as desired. The crude rubber is prepared in the usual way of preparing rubber, and is then mixed with other ingredients to give it the desired consistency, a composition of the following proportions being preferred: one pound of pure rubber, two pounds of Venetian red and two ounces of sulphur, the whole being mixed in the ordinary mixing-mill used in rubber factories. This mixture is then dissolved in the usual way of making rubber cement by adding benzine, naphtha, or other solvent until the mass is brought to such consistency that it may be readily spread by brush, applied by any ordinary cement-machine, or, as is preferred, by running the cotton belt through a bath of the solution or compound. After being thus coated or saturated with the rubber compound the belt is dried by hanging it in the air on a suitable frame, or by artificial heat, as by passing it over or around steam-heated surfaces, though I prefer to permit it to dry in the open air. One, two, or more coatings may be applied in the same manner, each coat being allowed to dry or partially dry before another is added. When the belt is well dried I coil it up for convenience in handling and take it to a steam-press, and there vulcanize its flat faces, a few feet at a time, or more, according to the length of the press. The edges of the belt receive no pressure and are not vulcanized in this operation, only the flat sides or faces of the belt being vulcanized and finished with smooth surfaces at this time. To vulcanize and finish the edges I next coil the belt and stand the coil on its end in the press, then bring a gentle pressure of the press upon the edges, and complete the curing or vulcanizing. While the faces are being pressed the naphtha passes off at the edges and escapes, and as the presence of the naphtha has been the cause of blistering in prior plans, and as such blistering destroys the value of the belt, the importance of this feature is apparent. After the naphtha is thus driven off the edges can be finished without difficulty.

I am aware that numerous attempts have been made to secure the result sought in this process, and that special machinery has been devised and constructed for that purpose, a rubber strip having in one case been applied to the edges and united by pressure to the plastic composition being applied to the faces. My invention differs from these, in that the covering of the belt is one homogeneous body, without joints or seams of any kind either at its edges or at any point on its faces.

In order to illustrate more clearly the manner of carrying out my invention, I have represented in the accompanying drawings all special apparatus necessary thereto, though I do not specifically claim said apparatus, which may be of ordinary construction.

Figure 1 represents a sectional view of the tank or vessel containing the solution and the drying frame or reel; Fig. 2, a view showing the reel and press; Fig. 3, the belt coiled preparatory to finishing its edges; Fig. 4, a crosssection of the press in the act of finishing the edges.

A represents the tank or vessel containing the rubber solution, having at its front a roller, $a$, over which the belt is carried into the tank, a second roller, $b$, near the bottom of the vessel, beneath which the web or belt is carried to insure its proper immersion, and at its rear side two rolls, $c$, between which the coated belt passes from the tank to the drying reel or frame B. This reel consists of a series of radial arms, $d$, grooved on their inner faces to receive the ends of cross-slats $e$, which are wider at their ends than at the middle to afford space between the slats when inserted in the grooves. The belt is drawn from the tank, and one after another of the arms provided with a slat or cross-piece and a layer of the belting wound thereon, another tier or series of slats being inserted and another layer of belting wound upon the rack, and so on until the belt is all wound upon the reel. The layers being separated as explained, the air acts upon the faces of the belt and rapidly dries the coating. When properly dried the belt is unwound and pressed and vulcanized in a press, C, a few feet at a time, or more, according to the capacity of the press, the naphtha or benzine passing off at the edges. It is then coiled and secured, as shown in Fig. 3, and the coil placed in the press on its end, as indicated in Fig. 4, to finish the edges. The different layers or coils support each other and prevent bending or curling over.

Having thus described my invention, what I claim is—

1. The herein-described method of forming rubber-surfaced belting, consisting in coating or saturating the woven or textile web or body of the belt with rubber composition, drying the same, vulcanizing the faces of the belt, and then coiling it and subjecting its edges to pressure in a vulcanizing-press, and thereby vulcanizing and finishing the edges, as set forth.

2. The herein-described method of finishing the edges of rubber-surfaced belting, consisting in coiling the belt into a compact body and subjecting the ends of the coil or the edges of the belt to pressure, as set forth.

JOHN W. GRAY.

Witnesses:
BENAJAH H. PLATO,
C. J. DIXON.